US006650716B1

(12) United States Patent
Ratnarajah

(10) Patent No.: US 6,650,716 B1
(45) Date of Patent: Nov. 18, 2003

(54) SPACE-TIME RECEIVER STRUCTURE FOR DIGITAL COMMUNICATION SYSTEMS

(75) Inventor: Tharmalingam Ratnarajah, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 640 days.

(21) Appl. No.: 09/624,028

(22) Filed: Jul. 24, 2000

(51) Int. Cl.$^7$ ................................................. H04B 7/10
(52) U.S. Cl. ...................... 375/347; 375/348; 455/296
(58) Field of Search ................................ 375/346, 347, 375/348; 455/296, 63; 348/607

(56) References Cited

U.S. PATENT DOCUMENTS 6,118,832 A * 9/2000 Mayrargue et al. ......... 375/346
6,314,147 B1 * 11/2001 Liang et al. ................ 375/346

OTHER PUBLICATIONS

Liang et al. "A Two–Stage Hybrid Approach for CCI/ISI Reduction with Space–Time Processing" IEEE vo.1. No. 6 1997.*

Jen–Wei Liang, et al. "A Space–Time Filtered Viterbi Receiver for CCI/ISI Reduction in TDMA System", Circuits, Systems and Signal Processing, 1998, vol. 1. pp. 85–102.

G.D. Forney, "Maximum–likelihood sequence estimation of digital sequences in the presence of intersymbol interference", IEEE Transactions on Information Theory, vol. IT–18, pp. 363–378, May 1972.

* cited by examiner

Primary Examiner—Temesghen Ghebretinsae

(57) ABSTRACT

A diversity hybrid receiver structure is provided for estimating the sequence of transmitted symbols in a digital communication system. A joint optimizer determines optimal effective channel coefficients for use by an equalizer using a power method, and determines optimal filter coefficients for use by a space-time filter. The space-time filter mitigates co-channel interference and produces an intermediate sequence of signal samples. The equalizer acts on the intermediate sequence of signal samples and corrects for intersymbol interference to estimate the transmitted sequence of symbols. The equalizer uses an efficient block decision-feedback sequence estimation method. An interference detection scheme is also provided.

27 Claims, 4 Drawing Sheets

SPACE-TIME RECEIVER STRUCTURE FOR DIGITAL COMMUNICATION SYSTEMS

RELATED APPLICATIONS

U.S. patent application entitled "Minimum Mean-Squared Error Block-Decision Feedback Sequence Estimation in Digital Communication Systems" by Ratnarajah et al., filed on same date, and assigned to the assignee of the present application, discloses and claims subject matter related to that of the present invention and is herein incorporated by reference.

FIELD OF THE INVENTION

This invention relates to digital communication systems, and more particularly to the estimation of the sequence of transmitted symbols in such systems.

BACKGROUND OF THE INVENTION

In EDGE (Enhanced Data Rates for GSM Evolution) cellular communication systems a sequence of symbols is transmitted as an 8 Phase Shift Keying (8-PSK) modulated signal. The signal may propagate along several propagation paths to a receiver. If the time delay between the various propagation paths is comparable to the intersymbol period, then the signal received by the receiver will contain intersymbol interference. The attenuation along each path will vary, as will phase changes due to reflections, so the intersymbol interference will not be merely additive. In addition, transmitted symbols in neighbouring cells in Time Division Multiple Access systems can cause co-channel interference. Finally, the received signal will contain noise, which is assumed to be additive white Gaussian noise.

The receiver must estimate the transmitted sequence of symbols s from the received sequence of signal samples x. In a diversity receiver having M antennae, the M spatially distinct received signal samples at any discrete time k can be represented as a vector $X_k=[x_1, \ldots, x_M]k^T$. A hybrid receiver considers the contributions of co-channel interference and intersymbol interference separately. The hybrid receiver includes a space-time filter which acts on the M received signal samples $x_k$ to mitigate co-channel interference, and an equalizer which then corrects for intersymbol interference. The output of the equalizer is an estimated sequence of symbols ŝ which ideally is equal to the transmitted sequence of symbols s.

If the space-time filter takes L+1 delayed time-taps of the received signal, then the spatially distinct received signal samples $x_k$ can be extended to include temporal distinctions. If ordered sequentially, the received signal samples can be represented as a space-time stacked vector of vectors $x_k = [x_k^T, \ldots, x_{k-L}^T]^T$ of length M(L+1), or $$x_k = \begin{bmatrix} x_{1,k} \\ \vdots \\ x_{M,k} \\ x_{1,k-1} \\ \vdots \\ x_{M,k-1} \\ \vdots \\ x_{1,k-L} \\ \vdots \\ x_{M,k-L} \end{bmatrix}$$

where for each element of the vector the first subscript refers to the antenna at which the signal sample was received, and the second subscript refers to the time-tap.

An intermediate signal sample $y_k$ can be defined as an output of the space-time filter such that $y^k=w^T x_k$ where w is a vector of M(L+1) space-time filter coefficients, $w=[w_{1,1}, \ldots, w_{M,1}, \ldots, w_{1,L+1}, \ldots, w_{M,L+1}]^T$. For a sequence of N received signal samples, the space-time stacked vector $x_k$ is extended to form a matrix $X=[x_k, \ldots, x_{k+N-1}]$, or $$X = \begin{bmatrix} x_{1,k} & x_{1,k+1} & \cdots & x_{1,k+N-1} \\ \vdots & \vdots & \cdots & \vdots \\ x_{M,k} & x_{M,k+1} & \cdots & x_{M,k+N-1} \\ x_{1,k-1} & x_{1,k} & \cdots & x_{1,k+N-2} \\ \vdots & \vdots & \cdots & \vdots \\ x_{M,k-1} & x_{M,k} & \cdots & x_{M,k+N-2} \\ \vdots & \vdots & \cdots & \vdots \\ x_{1,k-L} & x_{1,k+1-L} & \cdots & x_{1,k+N-1-L} \\ \vdots & \vdots & \cdots & \vdots \\ x_{M,k-L} & x_{M,k+1-L} & \cdots & x_{M,k+N-1-L} \end{bmatrix} \in C^{M(L+1) \times N}$$

and an intermediate sequence of signal samples y of length N is then produced by the space-time filter such that $y^T w^T X$.

The intermediate sequence of signal samples y can also be expressed as $y^T=h^T S+e^T$ where h is a vector of effective channel coefficients, S is a matrix of transmitted symbols of the form $$S = \begin{bmatrix} s_k & s_{k+1} & \cdots & s_{k+N-1} \\ s_{k-1} & s_k & \cdots & \vdots \\ \vdots & \vdots & \ddots & \vdots \\ s_{k-v-L} & \cdots & \cdots & s_{k-v-L+N-1} \end{bmatrix} \in C^{(v+L+1) \times N},$$

v+1 is the number of propagation paths being considered for the environment in which the signal propagates, v+L+1 is the number of effective channels which will be considered by the equalizer, and e is a disturbance. The effective channel coefficients are used in the equalizer, as discussed below. From the perspective of the equalizer y is a received sequence of signal samples having passed through v+L+1 effective channels with impulse response coefficients given by h, the effective channels consisting of the propagation paths and the effects of the space-time filter.

Combining the two expressions for y, it is seen that the disturbance can be expressed as $e^T=w^T X-h^T S$. A signal-to-interference-plus-noise ratio SINR can be defined as $$SINR = \frac{\|h^T S\|^2}{\|e\|^2}$$

$$SINR = \frac{\|h^T S\|^2}{\|w^T X - h^T S\|^2}$$

The filter coefficients w and the effective channel coefficients h are jointly optimized by maximizing the SINR with respect to w and h to produce optimal coefficients $w_{opt}$ and $h_{opt}$. Using the technique of separation of variables, $h_{opt}$ is found to be $$h_{opt} = \arg\max_{h} \frac{h^H S^* S^T h}{h^H S^* P^* S^T h} \in C^{(v+L+1) \times 1}$$

where $P=(I-X^H(XX^H)^{-1}X)$, I is an identity matrix, the superscript H indicates the Hermitian of the matrix or vector to which it refers, and the superscript indicates the complex conjugate of the matrix or vector to which it refers. This is a generalized eigenvalue problem, and $h_{opt}$ is the eigenvector corresponding to the largest eigenvalue of $(S^*P^*S^T)^{-1}S^*S^T$. $w_{opt}$ is then found from $$w_{opt}^T = h_{opt}^T S X^H (XX^H)^{-1}$$

$h_{opt}$ and $w_{opt}$ can be found if the matrices S and X are formed from known training data. Unfortunately the eigenvalue problem is a complex one, and an efficient method of determining $h_{opt}$ is needed.

Once $w_{opt}$ and $h_{opt}$ are determined the estimated sequence of symbols ŝ can be determined. The intermediate sequence of signal samples y produced by the space-time filter is found from $y^T = w^T X$ where X is now the matrix of received sequences of signal samples for user data rather than for training data, having N+v+L columns where N is the number of symbols in the transmitted sequence (which is half a slot in EDGE systems). From the perspective of the equalizer, y=Hs+e where H is a matrix of effective channel coefficients having the form $$H = \begin{bmatrix} h_1 & h_0 & 0 & \cdots & \cdots & \cdots & 0 \\ h_2 & h_1 & h_0 & \cdots & \cdots & \cdots & 0 \\ h_3 & h_2 & h_1 & \cdots & \cdots & \cdots & 0 \\ \vdots & \vdots & \vdots & \ddots & \ddots & \ddots & \vdots \\ h_{v+L} & h_{v+L-1} & h_{v+L-2} & \cdots & \cdots & \cdots & 0 \\ 0 & h_{v+L} & h_{v+L-1} & \cdots & \cdots & \cdots & 0 \\ \vdots & \vdots & \vdots & \cdots & \cdots & \cdots & \vdots \end{bmatrix} \in C^{(N+v+L) \times N}$$

and the values of the matrix elements hi are given by $h_{opt}$, determined earlier during the joint optimization.

One method of estimating the transmitted sequence of symbols in the presence of intersymbol interference is the Maximum Likelihood Sequence Estimation (MLSE) method. For each of the possible transmitted symbols, the received signal is compared with the signal that should have been received if it was that symbol that had been transmitted. Based on these comparisons, the MLSE method then selects the symbol which was most likely to have been transmitted. The MLSE method is a very accurate sequence estimation method. However, the complexity of the MLSE method is proportional to the number of possible transmitted symbols raised to the power of the number of effective channels being considered. In EDGE systems there are eight possible transmitted symbols and seven effective paths are considered (v=5, L=1), and the complexity of the MLSE method makes it impractical.

A second method of estimating the transmitted symbols is the Zero-Forcing Block Linear Equalizer (ZF-BLE) method. In the ZF-BLE method, the quantity Q is minimized with respect to s, where $$Q = \|y - Hs\|_{Ree}^2,$$

$R_{ee} = \epsilon\{ee^H\}$ is the expectation value of the covariance matrix of the disturbance, and the operator $\epsilon$ denotes an expectation value. The solution to this minimization is $$\hat{s} = (H^H R_{ee}^{-1} H)^{-1} H^H R_{ee}^{-1} y$$

where ŝ is the estimation of the sequence of transmitted symbols s. However the ZF-BLE method is less than optimum.

A hybrid receiver is needed in which the optimization of the coefficients $w_{opt}$ and $h_{opt}$ is simplified, and in which the sequence estimation method used in the equalizer does not have the complexity of the MLSE method and which improves performance over the ZF-BLE method.

SUMMARY OF THE INVENTION

The present invention provides a diversity hybrid receiver in a digital communication system. The receiver includes a joint optimization processor which contains instructions for producing optimal filter coefficients and optimal effective channel coefficients $h_{opt}$ from sequences of received training signal samples and a sequence of known training symbols. The receiver also includes a space-time filter which contains means for producing an intermediate sequence of signal samples y from a received sequence of signal samples and the optimal filter coefficients. The receiver also includes an equalization processor which contains instructions for producing an estimated sequence of symbols ŝ. These instructions comprise: forming a matrix of optimal effective channel coefficients H from the optimal effective channel coefficients $h_{opt}$; determining a lower triangular matrix L from a relationship $LL^H = H^H R_{ee}^{-1} H + I$ where LH is the Hermitian of L, HH is the Hermitian of H, I is an identity matrix, and $R_{ee}$ is a covariance matrix of a disturbance e; calculating a vector $z = L^{-1} H^H R_{ee-1}^{-1} y$; and determining an estimated sequence of symbols ŝ belonging to a set of discrete possible symbol values such that the square of the magnitude of a difference vector $L^H \hat{s} - z$ is minimized.

A diversity hybrid receiver is also provided in which, either with or without the equalization processor described above, there are M antennae, each antenna receiving one sequence of received training signal samples, and L time-taps of each sequence of received training signal samples is produced. The instructions contained in the joint optimization processor comprise: defining a matrix X from the sequences of received training signal samples as $$X = \begin{bmatrix} x_{1,k} & x_{1,k+1} & \cdots & x_{1,k+p} \\ \vdots & \vdots & \cdots & \vdots \\ x_{M,k} & x_{M,k+1} & \cdots & x_{M,k+p} \\ x_{1,k-1} & x_{1,k} & \cdots & x_{1,k+p-1} \\ \vdots & \vdots & \cdots & \vdots \\ x_{M,k-1} & x_{M,k} & \cdots & x_{M,k+p-1} \\ \vdots & \vdots & \cdots & \vdots \\ x_{1,k-L} & x_{1,k+1-L} & \cdots & x_{1,k+p-L} \\ \vdots & \vdots & \cdots & \vdots \\ x_{M,k-L} & x_{M,k+1-L} & \cdots & x_{M,k+p-L} \end{bmatrix} \in C^{M(L+1)\times(p+1)}$$

where k indicates the sequential position of a received training signal sample in a sequence of received training signal samples and p+1 indicates the number of received training signal samples in each sequence of received training signal samples; defining a matrix S from the sequence of known training symbols as $$S = \begin{bmatrix} s_k & s_{k+1} & \cdots & s_{k+p} \\ s_{k-1} & s_k & \cdots & \vdots \\ \vdots & \vdots & \ddots & \vdots \\ s_{k-v-L} & \cdots & \cdots & s_{k-v-L+p} \end{bmatrix} \in C^{(v+L+1)\times N}$$

where v+L+1 is the number of effective channels considered by the equalization processor; initializing $h_{opt}$ to be the first column of a matrix $B = (S^*P^*S^T)^{-1}S^*S^T$ where $P = (I - X^H(XX^H)^{-1}X)$ and $X^H$ is the Hermitian of X; and carrying out iterative steps a predetermined number of times, the iterative steps comprising calculating a vector $q = Bh_{opt}$ and calculating a new value for the vector $h_{opt} = q/\|q\|$.

An interference detection method is also provided in which a signal-to-interference-plus-noise ratio SINR is determined by: determining orthogonal weights $w_{opt}^\perp$ of the optimal filter coefficients $w_{opt}$; determining an interference pulse noise $y_I$ from the expression $$\underline{y}_I^T = \sum_{i=1}^{M(L+1)-1} (w_{opt_i}^\perp)^T X$$

where M(L+1)−1 is the number of orthogonal weights; determining an estimated desired signal $y_D$ from the expression $y_D^T = (w_{opt})^T X$; and determining the SINR as the ratio of the square of the magnitude of the interference pulse noise to the square of the magnitude of the estimated desired signal.

The methods provide an efficient means for determining the optimal filter coefficients and the optimal effective channel coefficients used by the space-time filter and the equalizer respectively. Furthermore, the accuracy of the sequence estimation is improved.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
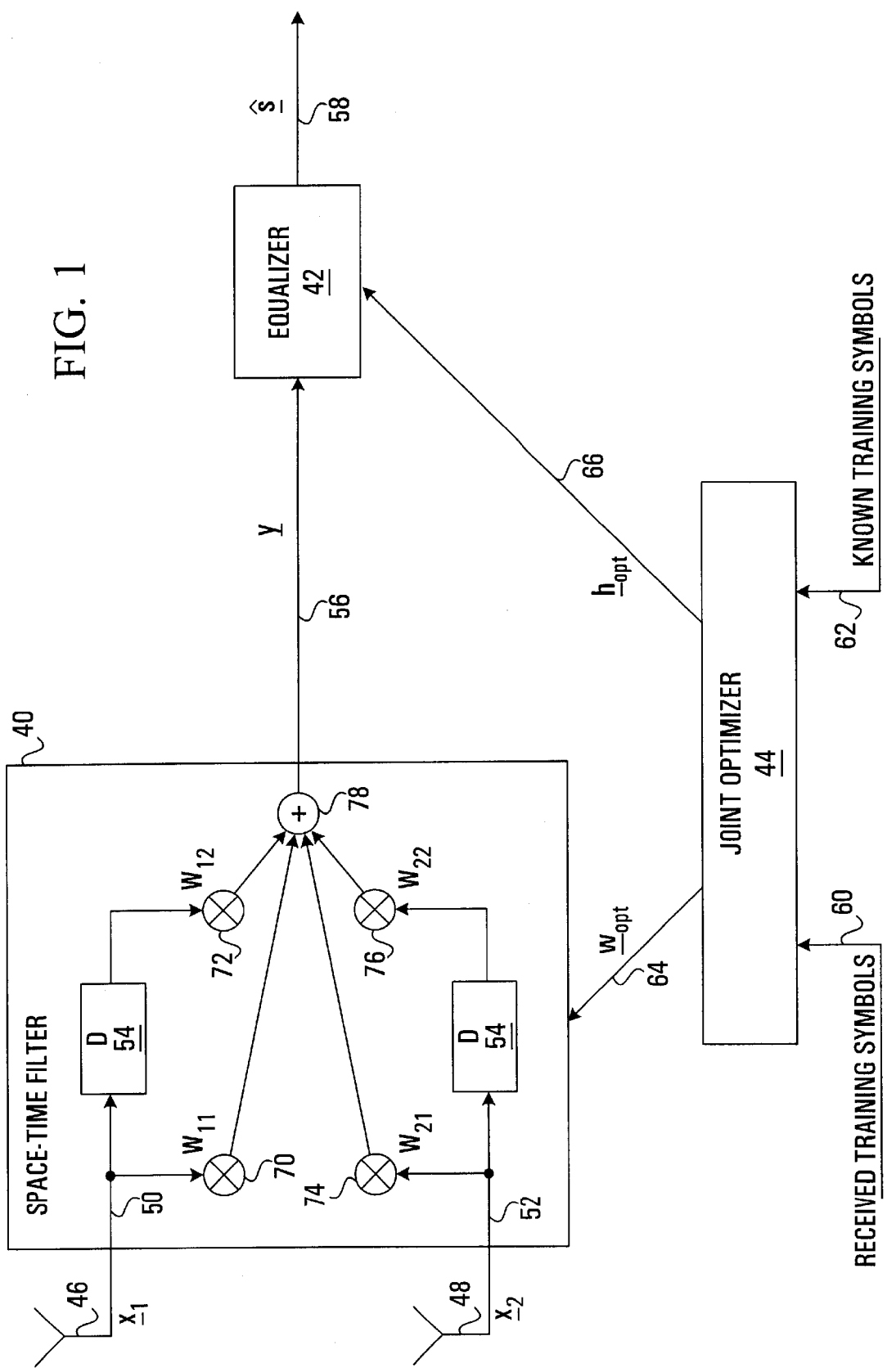
FIG. 1 is a block diagram illustrating an example diversity hybrid receiver.

Referring to FIG. 1, a hybrid diversity receiver is shown. The receiver comprises a space-time filter 40, an equalizer 42, and a joint optimizer 44. The diversity receiver shown has two antennae 46 and 48, though in general there may be M antennae. A transmitted sequence of N symbols s (not shown), each symbol having one of a set of discrete possible values, is transmitted along at least one propagation path to the receiver. The antenna 46 receives a first received sequence of signal samples $x_1$ 50, and the antenna 48 receives a second received sequence of signal samples $x_2$ 52, each received sequence of signal samples containing N signal samples. The received sequence of signal samples 50 is spatially distinct from the received sequence of signal samples 52. The space-time filter 40 takes time-taps of each received sequence of signal samples using delay blocks 54. The space-time filter 40 shown in FIG. 1 takes one time-tap of each received sequence of signal samples though in general there may be L time-taps taken of each received sequence of signal samples, and there will be M×L delay blocks. Collectively, the received sequences of signal samples and their respective time-taps can be represented as a matrix of received signal samples X given generally by $$X = \begin{bmatrix} x_{1,k} & x_{1,k+1} & \cdots & x_{1,k+N-1} \\ \vdots & \vdots & \cdots & \vdots \\ x_{M,k} & x_{M,k+1} & \cdots & x_{M,k+N-1} \\ x_{1,k-1} & x_{1,k} & \cdots & x_{1,k+N-2} \\ \vdots & \vdots & \cdots & \vdots \\ x_{M,k-1} & x_{M,k} & \cdots & x_{M,k+N-2} \\ \vdots & \vdots & \cdots & \vdots \\ x_{1,k-L} & x_{1,k+1-L} & \cdots & x_{1,k+N-1-L} \\ \vdots & \vdots & \cdots & \vdots \\ x_{M,k-L} & x_{M,k+1-L} & \cdots & x_{M,k+N-1-L} \end{bmatrix} \in C^{M(L+1)\times N}$$

where in the example of FIG. 1 there are two antennae so M=2, and there is one time-tap so L=1. Each signal sample and time-tap of a signal sample is multiplied by a filter coefficient w and passed to a summer 78. In the example of FIG. 1 there are four filter coefficients ($w_{11}$ 70, $w_{12}$ 72, $w_{21}$ 74, and $w_{22}$ 76) though there will in general be M(L+1) filter coefficients. The filter coefficients can be represented as a vector w. The space-time filter 40 determines an intermediate sequence of signal samples y at an output 56 of the summer 78 using a relationship $y^T = w^T X$. The intermediate sequence of signal samples y is passed to the equalizer 42 containing an equalization processor (not shown). The equalization processor produces an estimated sequence of symbols ŝ at an output 58 from a relationship y=Hs+e where H is a matrix of effective channel coefficients given by $$H = \begin{bmatrix} h_1 & h_0 & 0 & \cdots & \cdots & \cdots & 0 \\ h_2 & h_1 & h_0 & \cdots & \cdots & \cdots & 0 \\ h_3 & h_2 & h_1 & \cdots & \cdots & \cdots & 0 \\ \vdots & \vdots & \vdots & \ddots & \ddots & \ddots & \vdots \\ h_{v+L} & h_{v+L-1} & h_{v+L-2} & \cdots & \cdots & \cdots & 0 \\ 0 & h_{v+L} & h_{v+L-1} & \cdots & \cdots & \cdots & 0 \\ \vdots & \vdots & \vdots & \cdots & \cdots & \cdots & \vdots \end{bmatrix} \in C^{(N+v+L) \times N},$$

e is a disturbance, and $v+L+1$ is the number of effective channels being considered by the equalizer. The effective channel coefficients can be represented as a vector h.

The filter coefficients w and the effective channel coefficients h are generally not known by the space-time filter 40 or the equalizer 42. However optimal filter coefficients $w_{opt}$ and optimal effective channel coefficients $h_{opt}$ can be determined by the joint optimizer 44 and passed to the space-time filter 40 and the equalizer 42 to inputs 64 and 66 respectively. A sequence of $p+1$ known training symbols, transmitted temporally proximate to the transmitted sequence of symbols s, is received by the M antennae as M sequences of received training signal samples and passed to an input 60 of the joint optimizer 44. The joint optimizer 44 determines $w_{opt}$ and $h_{opt}$ by processing the sequence of known training symbols 62 with the M sequences of received training signal samples. L time-taps are produced of each sequence of received training signal samples. The matrix of received signal samples corresponding to training symbols, X, takes the form $$X = \begin{bmatrix} x_{1,k} & x_{1,k+1} & \cdots & x_{1,k+p} \\ \vdots & \vdots & \cdots & \vdots \\ x_{M,k} & x_{M,k+1} & \cdots & x_{M,k+p} \\ x_{1,k-1} & x_{1,k} & \cdots & x_{1,k+p-1} \\ \vdots & \vdots & \cdots & \vdots \\ x_{M,k-1} & x_{M,k} & \cdots & x_{M,k+p-1} \\ \vdots & \vdots & \cdots & \vdots \\ x_{1,k-L} & x_{1,k+1-L} & \cdots & x_{1,k+p-L} \\ \vdots & \vdots & \cdots & \vdots \\ x_{M,k-L} & x_{M,k+1-L} & \cdots & x_{M,k+p-L} \end{bmatrix} \in C^{M(L+1) \times (p+1)}$$

and a matrix of known training symbols S is formed as $$S = \begin{bmatrix} s_k & s_{k+1} & \cdots & s_{k+p} \\ s_{k-1} & s_k & \cdots & \vdots \\ \vdots & \vdots & \ddots & \vdots \\ s_{k-v-L} & \cdots & \cdots & s_{k-v-L+p} \end{bmatrix} \in C^{(v+L+1) \times N}$$

Figure 2:
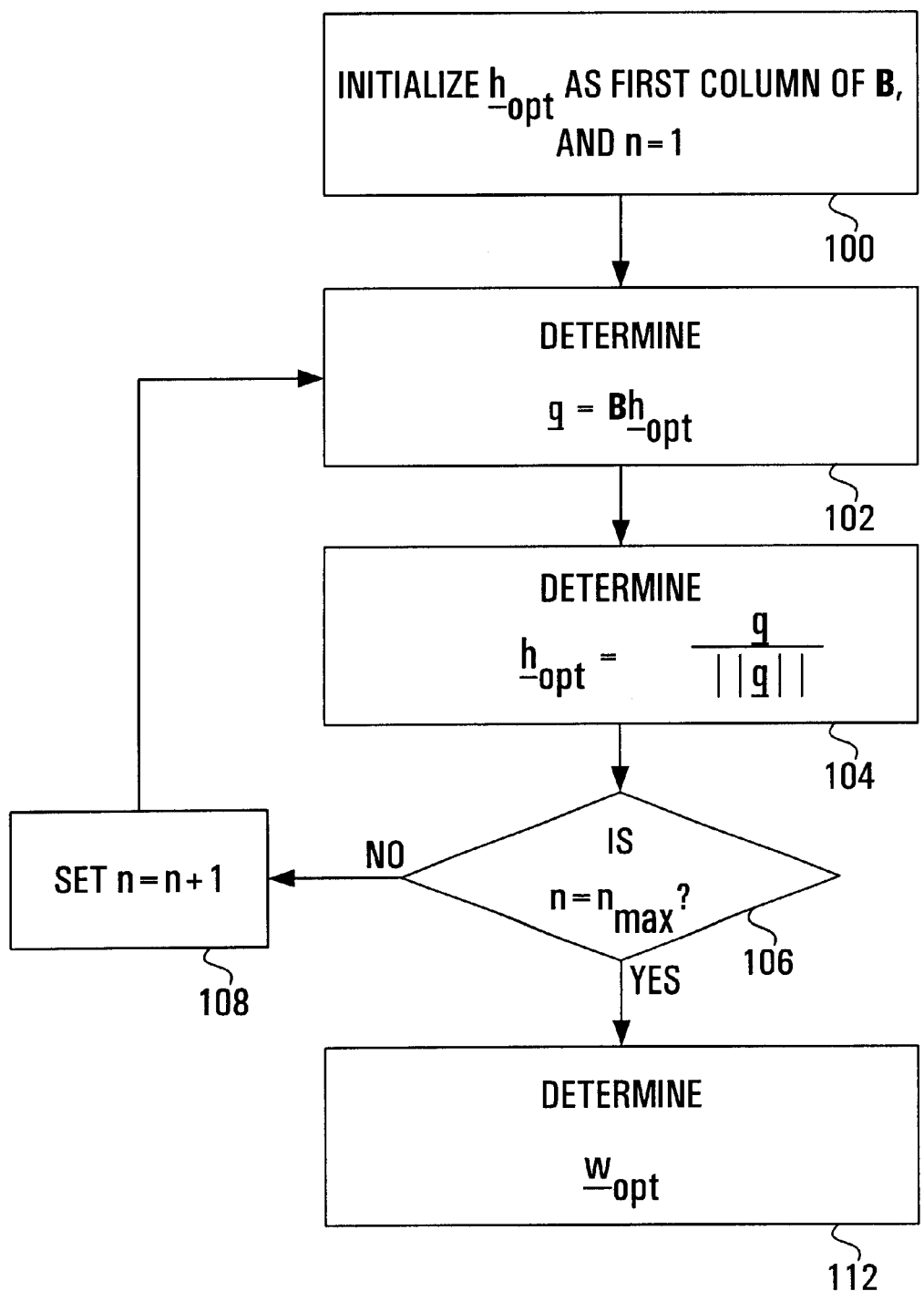
FIG. 2 is a flow chart showing the joint optimization method of the invention.

The solution to the joint maximization of a signal-to-interference-plus-noise ratio $$SINR = \frac{\|h^T S\|^2}{\|w^T X - h^T S\|^2}$$

indicates that $h_{opt}$ is an eigenvector corresponding to the largest eigenvalue of a matrix, $B=(S*P*S^T)^{-1}S*S^T$ where $P=(I-X^H(XX^H)^{-1}X)$, I is an identity matrix, and $X^H$ is the Hermitian of X. Referring to FIG. 2, the method by which a joint optimization processor in the joint optimizer 44 determines $w_{opt}$ and $h_{opt}$ is shown. A power method is used to determine the eigenvector of B corresponding the largest eigenvalue. At step 100 the value of $h_{opt}$ is initialized as the first column of the matrix. B and an integer n is initialized as $n=1$. A vector q is calculated from $q=Bh_{opt}$ at step 102. A new value for $h_{opt}$ is calculated at step 104 from $$h_{opt} = \frac{q}{\|q\|}$$

At step 106 the value of n is compared with a predetermined integer $n_{max}$. If n is not equal to $n_{max}$ then at step 108 the value of n is increased by one. The algorithm returns to step 102, creating an iterative loop that exits when n reaches $n_{max}$. When n reaches $n_{max}$ at step 106, $h_{opt}$ has the correct value, being an eigenvector corresponding to the largest eigenvalue of B. In fact, a value of $n_{max}=2$ is sufficient to obtain the required eigenvector. Once $h_{opt}$ has been found, $w_{opt}$ is determined at step 112 from $$w_{opt}^T = h_{opt}^T S X^H (XX^H)^{-1}$$

The estimated sequence of transmitted symbols ŝ can now be determined by the equalization processor using a Minimum Mean-Squared Error Block Decision-Feedback Sequence Estimation (MMSE-BDFSE) method. If the transmitted sequence of symbols s is presumed to have a distribution described by a mean $\mu$ and a covariance matrix $R_{ss}$, and recalling that $y=Hs+e$, then a solution for ŝ can be found by minimizing the expectation value of $\|ŝ-s\|^2$. The well known solution is $$ŝ = \mu + (H^H R_{ee}^{-1} H + R_{ss}^{-1})^{-1} H^H R_{ee}^{-1}(y - H\mu)$$

where $R_{ee}$ is the covariance matrix of the disturbance e and $H^H$ is the Hermitian of the matrix H. For an 8-PSK communication system, such as an EDGE system, $\mu=0$ and $R_{ss}=I$, and so $$ŝ = (H^H R_{ee}^{-1} H + I)^{-1} H^H R_{ee}^{-1} y$$

Figure 3:
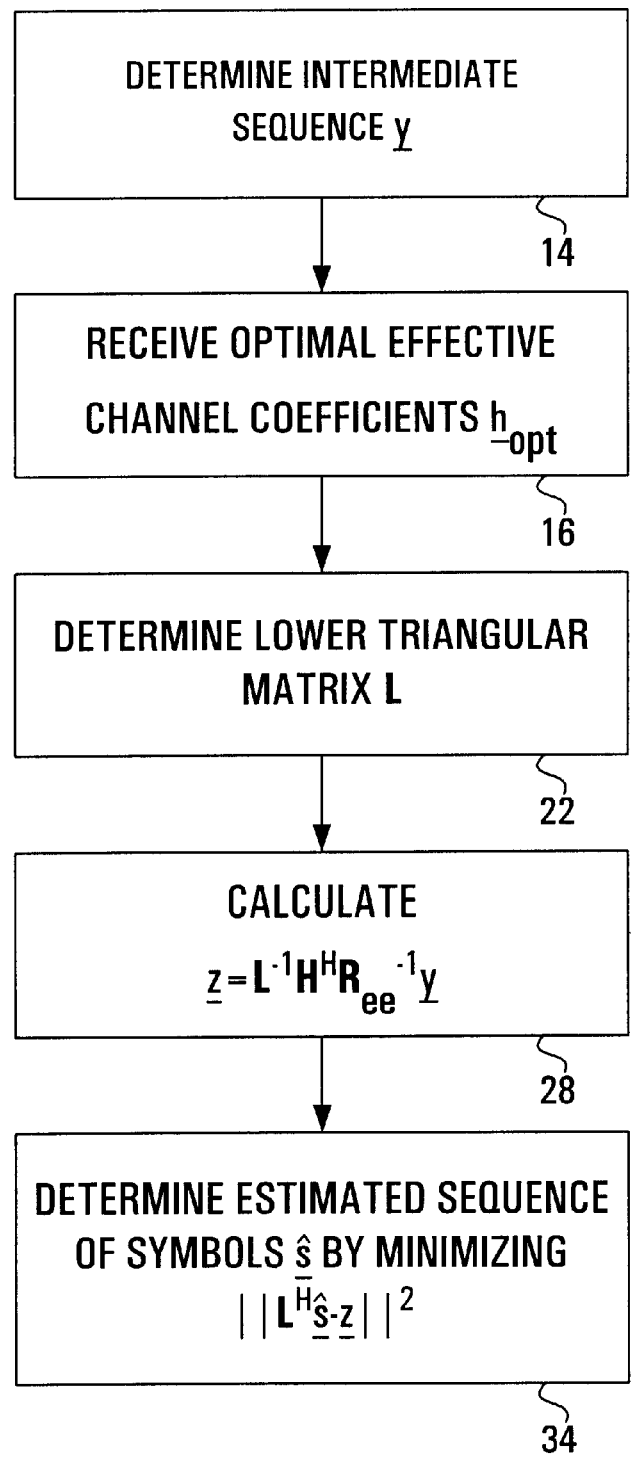
FIG. 3 is a flow chart showing the equalization method of the invention.

Referring to FIG. 3, the space-time filter 40 determines the intermediate sequence of signal samples y at step 14 from the expression $y^T = w_{opt}^T X$, where X is now the matrix of received signal samples and $w_{opt}$ has been determined by the joint optimization processor. The intermediate sequence of signal samples y is passed to the equalizer 42. The equalizer receives the optimal effective channel coefficients $h_{opt}$ at step 16. At step 22 the equalization processor determines a product of triangular matrices $LL^H$ by performing a Cholesky decomposition, such that $$LL^H = H^H R_{ee}^{-1} H + I$$

Substituting $LL^H$ into the solution for ŝ, and multiplying both sides of the equation by $L_H$, it can be readily seen that $$L^H ŝ = L^{-1} H^H R_{ee}^{-1} y$$

Although ŝ could be calculated from this expression, the resulting values would lie on a continuum and would generally not match the discrete possible values of the transmitted symbols. However, if a vector z is defined as $$z = L^{-1} H^H R_{ee}^{-1} y$$

and a difference vector Δ is defined as $$\Delta = L^H \hat{s} - z$$

then the equalization processor can determine ŝ by minimizing the square of the magnitude of the difference vector Δ with respect to the vector of discrete possible values. At step 28 the vector z is calculated.

If the vectors and matrix are expanded, the square of the magnitude of this difference vector is seen to be $$\|\Delta\|^2 = \left\| \begin{bmatrix} l_{11} & l_{12} & \cdots & l_{1N} \\ 0 & l_{22} & \cdots & l_{2N} \\ \vdots & \vdots & \ddots & \vdots \\ 0 & 0 & \cdots & l_{NN} \end{bmatrix} \begin{bmatrix} \hat{s}_1 \\ \hat{s}_2 \\ \vdots \\ \hat{s}_N \end{bmatrix} - \begin{bmatrix} z_1 \\ z_2 \\ \vdots \\ z_N \end{bmatrix} \right\|^2$$

and then $$\|\Delta\|^2 = \|l_{NN}\hat{s}_N - z_N\|^2 + \|l_{N-1,N-1}\hat{s}_{N-1} + l_{N-1,N}\hat{s}_N - z_{N-1}\|^2 + \ldots +$$

$$\left\| \sum_{j=i}^{N} l_{ij}\hat{s}_j - z_i \right\|^2 + \ldots + \left\| \sum_{j=1}^{N} l_{1j}\hat{s}_j - z_1 \right\|^2$$

For convenience, the terms in the above series will be referred to as $\Delta_N, \Delta_{N-1}, \ldots \Delta_1$. At step 34 the terms in the expression for $\|\Delta\|^2$ are minimized iteratively with respect to each possible discrete value of a transmitted symbol. The only unknown in the first term $\Delta_N$ is the value of the N-th estimated symbol $\hat{s}_N$. The term $\Delta_N$ is minimized by substituting in turn each possible value of the transmitted symbol into $\hat{s}_N$. The value which results in the lowest value of $\Delta_N$ is assigned to $\hat{s}_N$. The next term, $\Delta_{N-1}$, is minimized in the same way to find $\hat{s}_{N-1}$, using the value of $\hat{s}_N$ found when minimizing the previous term. This process is repeated for each term until a value is found for each symbol ŝ in the estimated sequence of symbols ŝ. The actual transmitted sequence of symbols s is then presumed to be the complete estimated sequence of symbols ŝ.

The above method minimizes the square of the magnitude of the difference vector with respect to the possible transmitted symbols one at a time. If a symbol is inaccurately estimated early in the method, the error will propagate through the estimation of the remaining symbols. The risk of this type of error can be reduced by grouping the vector and matrix elements in the expression $\|\Delta\|^2$ into blocks. A term in the expression for $\|\Delta\|^2$ can then be minimized with respect to several symbols simultaneously, yielding more accurate estimations. For example, if blocks of two elements are used, the matrix expression for $\|\Delta\|^2$ becomes $$\|\Delta\|^2 = \left\| \begin{bmatrix} L_{11} & L_{12} & \cdots & L_{1Q} \\ 0 & L_{22} & \cdots & L_{2Q} \\ \vdots & \vdots & \ddots & \vdots \\ 0 & 0 & \cdots & L_{QQ} \end{bmatrix} \begin{bmatrix} \hat{s}_1 \\ \hat{s}_2 \\ \vdots \\ \hat{s}_Q \end{bmatrix} - \begin{bmatrix} z_1 \\ z_2 \\ \vdots \\ z_Q \end{bmatrix} \right\|^2$$

and then $$\|\Delta\|^2 = \|L_{QQ}\hat{s}_Q - z_Q\|^2 + \|L_{Q-1,Q-1}\hat{s}_{Q-1} + L_{Q-1,Q}\hat{s}_Q - z_{Q-1}\|^2 + \ldots +$$

$$\left\| \sum_{j=i}^{Q} L_{ij}\hat{s}_j - z_i \right\|^2 + \ldots + \left\| \sum_{j=1}^{Q} l_{1j}\hat{s}_j - z_1 \right\|^2$$

where Q=N/2, $\hat{s}_1 = (\hat{s}_1, \hat{s}_2), \ldots \hat{s}_Q(\hat{s}_{N-1}, \hat{s}_N)$ $z_1 = (z_1, z_2), \ldots z_Q = (z_{N-1}, z_N)$, and $$L_{11} = \begin{bmatrix} l_{11} & l_{12} \\ 0 & l_{22} \end{bmatrix}, \ldots L_{QQ} = \begin{bmatrix} l_{N-1,N-1} & l_{N-1,N} \\ 0 & l_{N,N} \end{bmatrix}$$

The first term, $\Delta_Q$ is minimized with respect to $\hat{s}_Q$ by substituting each combination of two possible transmitted symbols into $\hat{s}_{N-1}$ and $\hat{s}_N$. The two values which result in the lowest value of $\Delta_Q$ are assigned to $\hat{s}_{N-1}$ and $\hat{s}_N$. The remaining terms are minimized in the same way, using the values of ŝ previously determined. The transmitted sequence of symbols s is then presumed to be the complete estimated sequence of symbols ŝ. Larger block sizes can yield more accurate estimations of the transmitted sequence. However since the number of combinations of symbol values which must be considered in minimizing each term is equal to the number of possible symbol values raised to the power of the size of the blocks, processing capabilities will limit the blocks to reasonable sizes (normally 3 or 4 for an 8-PSK communication system).

An alternate method by which the equalization processor can determine the estimated sequence of symbols is the Zero-Forcing Block Decision-Feedback Sequence Estimation (ZF-BDFSE) method. In the ZF-BDFSE method, no assumption regarding the statistical properties of the transmitted symbols is made. As in the ZF-BLE method the quantity $$Q = \|y - Hs\|_{R_{ee}}^2$$

is minimized, yielding the solution $$\hat{s} = (H^H R_{ee}^{-1} H)^{-1} H^H R_{ee}^{-1} y$$

However as with the MMSE-BDFSE method the equalization processor implementing the ZF-BDFSE method simplifies the calculations by determining a lower triangular matrix L, defined in this method by $$LL^H = H^H R_{ee}^{-1} H$$

The equalization processor then minimizes the difference vector, as is done when using the MMSE-BDFSE method. Although this alternative has the advantage of not requiring any assumptions about the statistical properties of the transmitted sequence of symbols, it has a disadvantage in that a solution for L does not always exist. A matrix L can only be found if the effective channel correlation matrix $H^H R_{ee}^{-1} H$ is positive definite. To avoid this risk noise can be added to the matrix H, but this results in performance degradation.

Figure 4:
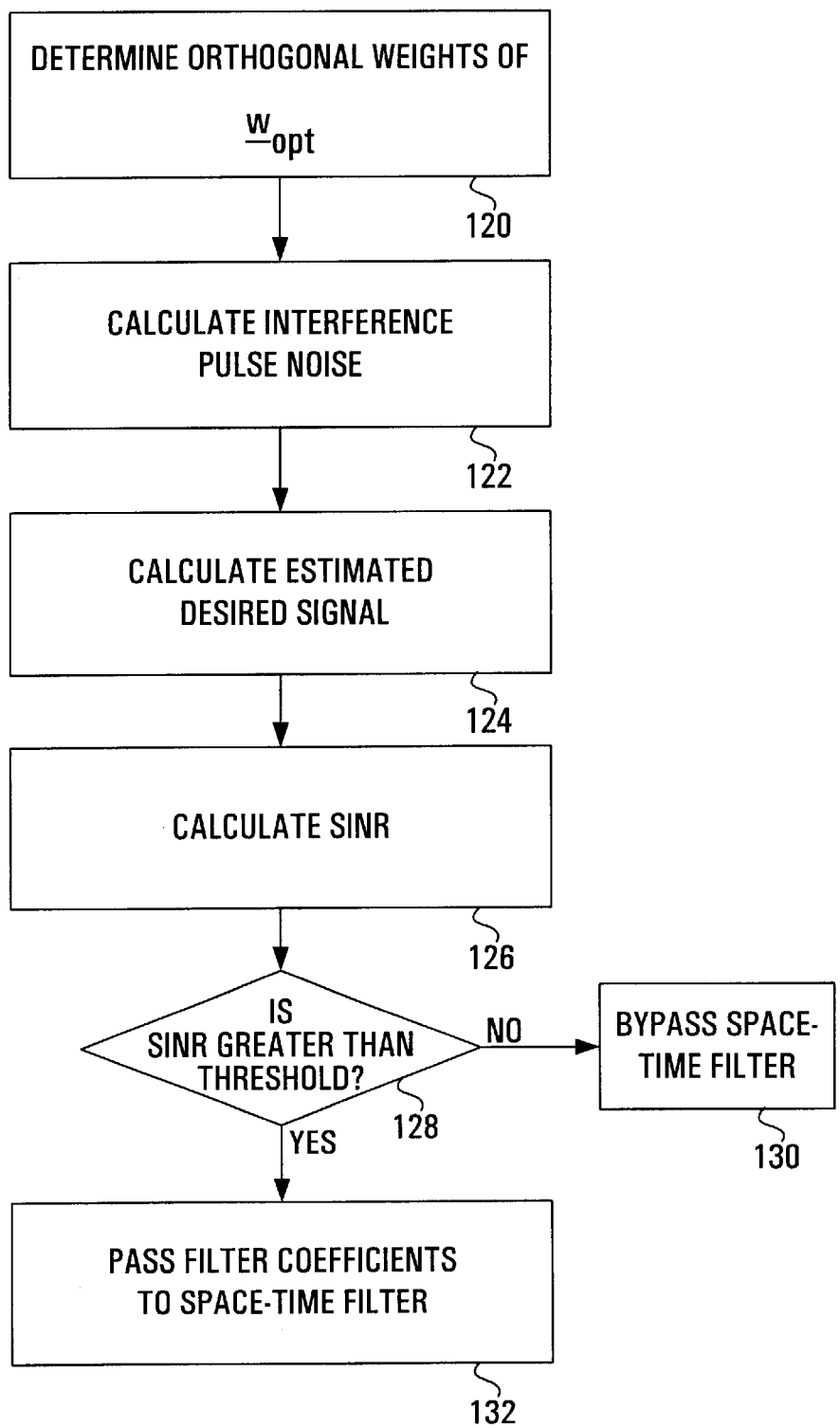
FIG. 4 is a flow chart showing the interference detection method of the invention.

Referring to FIG. 4, the hybrid receiver may also implement an interference detection method. Once the joint optimization processor has determined $w_{opt}$ as described above, an interference detection processor determines a set of orthogonal weights $w^\perp_{opt}$ for $w^\perp_{opt}$ at step 120. An interference pulse noise $y_I$ is then calculated at step 122 from an expression $$\underline{y}_I^T = \sum_{i=1}^{M(L+1)-1} (w_{opt_i}^\perp)^T X$$

where M(L+1) is the number of filter coefficients (and hence M(L+1)−1 is the number of orthogonal weights for $w_{opt}$, a vector of dimension M(L+1)), and X is the matrix of received signal samples corresponding to training symbols. An estimated desired signal $y_D$ is calculated at step 124 from an expression $$y_D{}^T = (1\ w_{opt})^T X$$

An estimated signal-to-interference-plus-noise ratio SINR is calculated at step 126 as $$\mathrm{SIN}R = \frac{\|\underline{y}_I\|^2}{\|\underline{y}_D\|^2}$$

If at step 128 the value of SINR calculated by the interference detection processor is larger than a threshold, then the optimal filter coefficients $w_{opt}$ are passed to the space-time filter, and the estimated sequence of symbols ŝ is determined by the space-time filter and the equalizer as described above. Otherwise, the space-time filter can be bypassed at step 130. In such an event, the equalizer alone is used to determine the estimated sequence of symbols ŝ. The related U.S. patent application entitled "Minimum Mean-Squared Error Block-Decision Feedback Sequence Estimation in Digital Communication Systems" by Ratnarajah et al., incorporated by reference herein, discloses a sequence estimation method when multiple antennae are present. If space-time filter is bypassed at step 130 in the present invention, the equalizer preferably implements the method disclosed in that related application, although this need not be the case.

The invention is not confined to EDGE communication systems, nor even to 8-PSK communication systems, but can be applied in any digital communication system. However the MMSE-BDFSE method of implementing the equalizer requires that the transmitted symbols have a mean of 0 and a covariance matrix given by an identity matrix.

What has been described is merely illustrative of the application of the principles of the invention. Other arrangements and methods can be implemented by those skilled in the art without departing from the spirit and scope of the present invention.

I claim:

1. A diversity hybrid receiver in a digital communication system, the receiver including:
   a joint optimization processor including instructions for producing a plurality of optimal filter coefficients and a plurality of optimal effective channel coefficients $h_{opt}$ from a plurality of sequences of received training signal samples and a sequence of known training symbols;
   a space-time filter including means for producing an intermediate sequence of signal samples y from a plurality of received sequences of signal samples and the optimal filter coefficients; and
   an equalization processor including instructions for producing an estimated sequence of symbols ŝ, the instructions comprising:
      instructions for forming a matrix of optimal effective channel coefficients H from the optimal effective channel coefficients $h_{opt}$;
      instructions for determining a lower triangular matrix L from a relationship $LL^H = H^H R_{ee}^{-1} H + I$ where $L^H$ is the Hermitian of L, $H^H$ is the Hermitian of H, I is an identity matrix, and $R_{ee}$ is a covariance matrix of a disturbance e;
      instructions for calculating a vector $z = L^{-1} H^H R_{ee}^{-1} y$; and
      instructions for determining an estimated sequence of symbols ŝ belonging to a set of discrete possible symbol values such that the square of the magnitude of a difference vector $L^H ŝ - z$ is minimized.

2. The receiver of claim 1 wherein the matrix L is determined from a relationship $LL^H = H^H R_{ee}^{-1} H$.

3. The receiver of claim 1 wherein the instructions for determining the estimated sequence of symbols comprise instructions for minimizing each term in the expression for the square of the magnitude of the difference vector successively in order of increasing number of symbols needed to resolve the term.

4. The receiver of claim 3 wherein a first term has an integral number of symbols needed to resolve the first term, and all other terms have a successively greater number of symbols needed to resolve the term equal to the integral number of symbols needed to resolve the first term.

5. The receiver of claim 4 wherein the integral number of symbols needed to resolve the first term is larger than one.

6. The receiver of claim 2 wherein the instructions for determining the estimated sequence of symbols comprise instructions for minimizing each term in the expression for the square of the magnitude of the difference vector successively in order of increasing number of symbols needed to resolve the term.

7. The receiver of claim 6 wherein a first term has an integral number of symbols needed to resolve the first term, and all other terms have a successively greater number of symbols needed to resolve the term equal to the integral number of symbols needed to resolve the first term.

8. The receiver of claim 7 wherein the integral number of symbols needed to resolve the first term is larger than one.

9. The receiver of claim 1 wherein the receiver has M antennae, each antenna receiving one sequence of received training signal samples, the receiver including means for producing L time-taps of each sequence of received training signal samples, and the instructions included in the joint optimization processor comprise:
   instructions for defining a matrix X from the sequences of received training signal samples as $$X = \begin{bmatrix} x_{1,k} & x_{1,k+1} & \cdots & x_{1,k+p} \\ \vdots & \vdots & \cdots & \vdots \\ x_{M,k} & x_{M,k+1} & \cdots & x_{M,k+p} \\ x_{1,k-1} & x_{1,k} & \cdots & x_{1,k+p-1} \\ \vdots & \vdots & \cdots & \vdots \\ x_{M,k-1} & x_{M,k} & \cdots & x_{M,k+p-1} \\ \vdots & \vdots & \cdots & \vdots \\ x_{1,k-L} & x_{1,k+1-L} & \cdots & x_{1,k+p-L} \\ \vdots & \vdots & \cdots & \vdots \\ x_{M,k-L} & x_{M,k+1-L} & \cdots & x_{M,k+p-L} \end{bmatrix} \in C^{M(L+1) \times (p+1)}$$

where k indicates a sequential position of a received training signal sample in a sequence of received training signal samples and p+1 indicates the number of received training signal samples in each sequence of received training signal samples;

instructions for defining a matrix S from the sequence of known training symbols as $$S = \begin{bmatrix} s_k & s_{k+1} & \cdots & s_{k+p} \\ s_{k-1} & s_k & \cdots & \vdots \\ \vdots & \vdots & \ddots & \vdots \\ s_{k-v-L} & \cdots & \cdots & s_{k-v-L+p} \end{bmatrix} \in C^{(v+L+1) \times N}$$

where v+L+1 is the number of a plurality of effective channels considered by the equalization processor;

instructions for initializing $h_{opt}$ to be the first column of a matrix $B=(S*P*S^T)^{-1}S*S^T$ where $P=(I-X^H(XX^H)^{-1}X)$ and $X^H$ is the Hermitian of X; and instructions for carrying out iterative steps a predetermined number of times, the iterative steps comprising:
        calculating a vector $q=Bh_{opt}$; and
        calculating a new value for the vector $h_{opt}=q/\|q\|$.

10. The receiver of claim 9 wherein the matrix L is determined from a relationship $LL^H=H^H R_{ee}^{-1} H$.

11. The receiver of claim 9 wherein the instructions for determining the estimated sequence of symbols comprise instructions for minimizing each term in the expression for the square of the magnitude of the difference vector successively in order of increasing number of symbols needed to resolve the term.

12. The receiver of claim 11 wherein a first term has an integral number of symbols needed to resolve the first term, and all other terms have a successively greater number of symbols needed to resolve the term equal to the integral number of symbols needed to resolve the first term.

13. The receiver of claim 12 wherein the integral number of symbols needed to resolve the first term is larger than one.

14. The receiver of claim 10 wherein the instructions for determining the estimated sequence of symbols comprise instructions for minimizing each term in the expression for the square of the magnitude of the difference vector successively in order of increasing number of symbols needed to resolve the term.

15. The receiver of claim 14 wherein a first term has an integral number of symbols needed to resolve the first term, and all other terms have a successively greater number of symbols needed to resolve the term equal to the integral number of symbols needed to resolve the first term.

16. The receiver of claim 15 wherein the integral number of symbols needed to resolve the first term is larger than one.

17. A diversity hybrid receiver in a digital communication system, the receiver having M antennae, each antenna receiving one sequence of received training signal samples, the receiver including:

a space-time filter including means for producing an intermediate sequence of signal samples from a plurality of received sequences of signal samples and a plurality of optimal filter coefficients;

means for producing L time-taps of each sequence of received training signal samples;

an equalizer including means for producing an estimated sequence of symbols from the intermediate sequence of signal samples and a plurality of optimal effective channel coefficients $h_{opt}$; and a joint optimization processor including instructions for producing the optimal filter coefficients and the optimal effective channel coefficients from the sequences of received training signal samples x and a sequence of known training symbols s, the instructions for producing the optimal filter coefficients comprising:

instructions for defining a matrix X from the sequences of received training signal samples as $$X = \begin{bmatrix} x_{1,k} & x_{1,k+1} & \cdots & x_{1,k+p} \\ \vdots & \vdots & \cdots & \vdots \\ x_{M,k} & x_{M,k+1} & \cdots & x_{M,k+p} \\ x_{1,k-1} & x_{1,k} & \cdots & x_{1,k+p-1} \\ \vdots & \vdots & \cdots & \vdots \\ x_{M,k-1} & x_{M,k} & \cdots & x_{M,k+p-1} \\ \vdots & \vdots & \cdots & \vdots \\ x_{1,k-L} & x_{1,k+1-L} & \cdots & x_{1,k+p-L} \\ \vdots & \vdots & \cdots & \vdots \\ x_{M,k-L} & x_{M,k+1-L} & \cdots & x_{M,k+p-L} \end{bmatrix} \in C^{M(L+1) \times (p+1)}$$

where k indicates a sequential position of a received training signal sample in a sequence of received training signal samples and p+1 indicates the number of received training signal samples in each sequence of received training signal samples;

instructions for defining a matrix S from the sequence of known training symbols as $$S = \begin{bmatrix} s_k & s_{k+1} & \cdots & s_{k+p} \\ s_{k-1} & s_k & \cdots & \vdots \\ \vdots & \vdots & \ddots & \vdots \\ s_{k-v-L} & \cdots & \cdots & s_{k-v-L+p} \end{bmatrix} \in C^{(v+L+1) \times N}$$

where v+L+1 is the number of a plurality of effective channels considered by the equalizer;

instructions for initializing $h_{opt}$ to be the first column of a matrix $B=(S*P*S^T)^{-1}S*S^T$ where $P=(I-X^H(XX^H)^{-1}X)$, I is an identity matrix, and $X^H$ is the Hermitian of X; and instructions for carrying out iterative steps a predetermined number of times, the iterative steps comprising:
            calculating a vector $q=Bh_{opt}$; and
            calculating a new value for the vector $h_{opt}=q/\|q\|$.

18. In a diversity hybrid receiver in a digital communication system, a method of determining a plurality of optimal effective channel coefficients $h_{opt}$, the receiver including M antennae, each antenna receiving one sequence of received training signal samples, the receiver also including means for producing L time-taps of each sequence of received training signal samples, the method comprising the steps of:

defining a matrix X from the sequences of received training signal samples as $$X = \begin{bmatrix} x_{1,k} & x_{1,k+1} & \cdots & x_{1,k+p} \\ \vdots & \vdots & \cdots & \vdots \\ x_{M,k} & x_{M,k+1} & \cdots & x_{M,k+p} \\ x_{1,k-1} & x_{1,k} & \cdots & x_{1,k+p-1} \\ \vdots & \vdots & \cdots & \vdots \\ x_{M,k-1} & x_{M,k} & \cdots & x_{M,k+p-1} \\ \vdots & \vdots & \cdots & \vdots \\ x_{1,k-L} & x_{1,k+1-L} & \cdots & x_{1,k+p-L} \\ \vdots & \vdots & \cdots & \vdots \\ x_{M,k-L} & x_{M,k+1-L} & \cdots & x_{M,k+p-L} \end{bmatrix} \in C^{M(L+1)\times(p+1)}$$

where k indicates a sequential position of a received training signal sample in a sequence of received training signal samples and p+1 indicates the number of received training signal samples in each sequence of received training signal samples;

defining a matrix S from the sequence of known training symbols as $$S = \begin{bmatrix} s_k & s_{k+1} & \cdots & s_{k+p} \\ s_{k-1} & s_k & \cdots & \vdots \\ \vdots & \vdots & \ddots & \vdots \\ s_{k-v-L} & \cdots & \cdots & s_{k-v-L+p} \end{bmatrix} \in C^{(v+L+1)\times N}$$

where v+L+1 is the number of a plurality of effective channels considered by an equalizer;
initializing $h_{opt}$ to be the first column of a matrix $B=(S*P*S^T)^{-1}S*S^T$ where $P=(I-X^H(XX^H)^{-1}X)$ I is an identity matrix, and $X^H$ is the Hermitian of X; and
carrying out iterative steps a predetermined number of times, the iterative steps comprising:
calculating a vector $q=Bh_{opt}$; and
calculating a new value for the vector $h_{opt}=q/\|q\|$.

19. For a diversity hybrid receiver in a digital communication system, a processor containing instructions for determining a plurality of optimal effective channel coefficients $h_{opt}$, the receiver including M antennae, each antenna receiving one sequence of received training signal samples, the receiver also including means for producing L time-taps of each sequence of received training signal samples, the instructions comprising:

instructions for defining a matrix X from the sequences of received training signal samples as $$X = \begin{bmatrix} x_{1,k} & x_{1,k+1} & \cdots & x_{1,k+p} \\ \vdots & \vdots & \cdots & \vdots \\ x_{M,k} & x_{M,k+1} & \cdots & x_{M,k+p} \\ x_{1,k-1} & x_{1,k} & \cdots & x_{1,k+p-1} \\ \vdots & \vdots & \cdots & \vdots \\ x_{M,k-1} & x_{M,k} & \cdots & x_{M,k+p-1} \\ \vdots & \vdots & \cdots & \vdots \\ x_{1,k-L} & x_{1,k+1-L} & \cdots & x_{1,k+p-L} \\ \vdots & \vdots & \cdots & \vdots \\ x_{M,k-L} & x_{M,k+1-L} & \cdots & x_{M,k+p-L} \end{bmatrix} \in C^{M(L+1)\times(p+1)}$$

where k indicates a sequential position of a received training signal sample in a sequence of received training signal samples and p+1 indicates the number of received training signal samples in each sequence of received training signal samples;

instructions for defining a matrix S from the sequence of known training symbols as $$S = \begin{bmatrix} s_k & s_{k+1} & \cdots & s_{k+p} \\ s_{k-1} & s_k & \cdots & \vdots \\ \vdots & \vdots & \ddots & \vdots \\ s_{k-v-L} & \cdots & \cdots & s_{k-v-L+p} \end{bmatrix} \in C^{(v+L+1)\times N}$$

where v+L+1 is the number of a plurality of effective channels considered by an equalizer;
instructions for initializing $h_{opt}$ to be the first column of a matrix $B=(S*P*S^T)^{-1}S*S^T$ where $P=(I-X^H(XX^H)^{-1}X)$, I is an identity matrix, and $X^H$ is the Hermitian of X; and
instructions for carrying out iterative steps a predetermined number of times, the iterative steps comprising:
calculating a vector $q=Bh_{opt}$; and
calculating a new value for the vector $h_{opt}=q/\|q\|$.

20. In a diversity hybrid receiver in a digital communication system, a method of determining a signal-to-interference-plus-noise ratio, the receiver receiving a plurality of M sequences of received training signal samples, the receiver including means for producing L time-taps of each sequence of received training signal samples, the receiver also including means for producing a plurality of optimal filter coefficients $w_{opt}$ from the plurality of sequences of received training signal samples and a sequence of known training symbols, the method comprising the steps of:

determining a plurality of orthogonal weights $w^\perp_{opt}$ of the optimal filter coefficients $w_{opt}$;

defining a matrix X from the sequences of received training signal samples $$X = \begin{bmatrix} x_{1,k} & x_{1,k+1} & \cdots & x_{1,k+p} \\ \vdots & \vdots & \cdots & \vdots \\ x_{M,k} & x_{M,k+1} & \cdots & x_{M,k+p} \\ x_{1,k-1} & x_{1,k} & \cdots & x_{1,k+p-1} \\ \vdots & \vdots & \cdots & \vdots \\ x_{M,k-1} & x_{M,k} & \cdots & x_{M,k+p-1} \\ \vdots & \vdots & \cdots & \vdots \\ x_{1,k-L} & x_{1,k+1-L} & \cdots & x_{1,k+p-L} \\ \vdots & \vdots & \cdots & \vdots \\ x_{M,k-L} & x_{M,k+1-L} & \cdots & x_{M,k+p-L} \end{bmatrix} \in C^{M(L+1)\times(p+1)}$$

where k indicates a sequential position of a received training signal sample in a sequence of received training signal samples and p+1 indicates the number of received training signal samples in each sequence of received training signal samples;

determining an interference pulse noise $y_I$ from an expression $$\underline{y}_I^T = \sum_{i=1}^{M(L+1)-1} (\underline{w}^\perp_{opt_i})^T X$$

where M(L+1)−1 is the number of orthogonal weights;

determining an estimated desired signal $y_D$ from an expression $$y_D^T = (w_{opt})^T X;\text{ and}$$

determining the signal-to-interference-plus-noise ratio as the ratio of the square of the magnitude of the interference pulse noise to the square of the magnitude of the estimated desired signal.

21. In a diversity hybrid receiver in a digital communication system, an interference detection processor, the receiver receiving a plurality of M sequences of received training signal samples, the receiver including means for producing L time-taps of each sequence of received training signal samples, the receiver also including means for producing a plurality of optimal filter coefficients $w_{opt}$ from the plurality of sequences of received training signal samples and a sequence of known training symbols, the interference detection processor including instructions for determining a signal-to-interference-plus-noise-ratio, the instructions comprising:

instructions for determining a plurality of orthogonal weights $w^{\perp}_{opt}$ of the optimal filter coefficients $w_{opt}$;

instructions for defining a matrix X from the sequences of received training signal samples as $$X = \begin{bmatrix} x_{1,k} & x_{1,k+1} & \cdots & x_{1,k+p} \\ \vdots & \vdots & \cdots & \vdots \\ x_{M,k} & x_{M,k+1} & \cdots & x_{M,k+p} \\ x_{1,k-1} & x_{1,k} & \cdots & x_{1,k+p-1} \\ \vdots & \vdots & \cdots & \vdots \\ x_{M,k-1} & x_{M,k} & \cdots & x_{M,k+p-1} \\ \vdots & \vdots & \cdots & \vdots \\ x_{1,k-L} & x_{1,k+1-L} & \cdots & x_{1,k+p-L} \\ \vdots & \vdots & \cdots & \vdots \\ x_{M,k-L} & x_{M,k+1-L} & \cdots & x_{M,k+p-L} \end{bmatrix} \in C^{M(L+1)\times(p+1)}$$

where k indicates a sequential position of a received training signal sample in a sequence of received training signal samples and p+1 indicates the number of received training signal samples in each sequence of received training signal samples;

instructions for determining an interference pulse noise $y_I$ from an expression $$\underline{y}_I^T = \sum_{i=1}^{M(L+1)-1} (\underline{w}^{\perp}_{opt_i})^T X$$

where M(L+1)−1 is the number of orthogonal weights;

instructions for determining an estimated desired signal $y_D$ from an expression $$y_D^T = (w_{opt})^T X; \text{ and}$$

instructions for determining the signal-to-interference-plus-noise ratio as the ratio of the square of the magnitude of the interference pulse noise to the square of the magnitude of the estimated desired signal.

22. The receiver of claim 1 wherein the receiver further includes:

means for producing L, time-taps of each sequence of received training symbol samples; and an interference detection processor which includes instructions for determining a signal-to-interference-plus-noise ratio, the instructions comprising:

instructions for determining a plurality of orthogonal weights $w^{\perp}_{opt}$ of the optimal filter coefficients $w_{opt}$;

instructions for defining a matrix X from the sequences of received training signal samples as $$X = \begin{bmatrix} x_{1,k} & x_{1,k+1} & \cdots & x_{1,k+p} \\ \vdots & \vdots & \cdots & \vdots \\ x_{M,k} & x_{M,k+1} & \cdots & x_{M,k+p} \\ x_{1,k-1} & x_{1,k} & \cdots & x_{1,k+p-1} \\ \vdots & \vdots & \cdots & \vdots \\ x_{M,k-1} & x_{M,k} & \cdots & x_{M,k+p-1} \\ \vdots & \vdots & \cdots & \vdots \\ x_{1,k-L} & x_{1,k+1-L} & \cdots & x_{1,k+p-L} \\ \vdots & \vdots & \cdots & \vdots \\ x_{M,k-L} & x_{M,k+1-L} & \cdots & x_{M,k+p-L} \end{bmatrix} \in C^{M(L+1)\times(p+1)}$$

where k indicates a sequential position of a received training signal sample in a sequence of received training signal samples, p+1 indicates the number of received training signal samples in each sequence of received training signal samples, and M indicates the number of sequences of received training signal samples;

instructions for determining an interference pulse noise $y_I$ from an expression $$\underline{y}_I^T = \sum_{i=1}^{M(L+1)-1} (\underline{w}^{\perp}_{opt_i})^T X$$

where M(L+1)−1 is the number of orthogonal weights;

instructions for determining an estimated desired signal $y^D$ from an expression $$y_D^T = (w_{opt})^T X; \text{ and}$$

instructions for determining the signal-to-interference-plus-noise ratio as the ratio of the square of the magnitude of the interference pulse noise to the square of the magnitude of the estimated desired signal.

23. The receiver of claim 22 wherein, in the event that the signal-to-interference-plus-noise ratio is below a threshold, the space-time filter is bypassed and the equalization processor determines the estimated sequence of symbols ŝ from the plurality of received sequences of signal samples and from a plurality of matrices of channel impulse response coefficients.

24. The receiver of claim 9 further including an interference detection processor which includes instructions for determining a signal-to-interference-plus-noise ratio, the instructions comprising:

instructions for determining a plurality of orthogonal weights $w^{\perp}_{opt}$ of the optimal filter coefficients $w_{opt}$;

instructions for determining an interference pulse noise $y_I$ from an expression $$y_I^T = \sum_{i=1}^{M(L+1)-1} (w_{opt_i}^\perp)^T X$$

where M(L+1)−1 is the number of orthogonal weights;

instructions for determining an estimated desired signal $y_D$ from an expression $$y_D^T = (w_{opt})^T X;\text{ and}$$

instructions for determining the signal-to-interference-plus-noise ratio as the ratio of the square of the magnitude of the interference pulse noise to the square of the magnitude of the estimated desired signal.

25. The receiver of claim 24 wherein, in the event that the signal-to-interference-plus-noise ratio is below a threshold, the space-time filter is bypassed and the equalization processor determines the estimated sequence of symbols ŝ from the plurality of received sequences of signal samples and from a plurality of matrices of channel impulse response coefficients.

26. The receiver of claim 17 further including an interference detection processor which includes instructions for determining a signal-to-interference-plus-noise ratio, the instructions comprising:

instructions for determining a plurality of orthogonal weights $w^\perp_{opt}$ of the optimal filter coefficients $w_{opt}$;

instructions for determining an interference pulse noise $y_I$ from an expression $$y_I^T = \sum_{i=1}^{M(L+1)-1} (w_{opt_i}^\perp)^T X$$

where M(L+1)−1 is the number of orthogonal weights;

instructions for determining an estimated desired signal $y_D$ from an expression $$y_D^T = (w_{opt})^T X;\text{ and}$$

instructions for determining the signal-to-interference-plus-noise ratio as the ratio of the square of the magnitude of the interference pulse noise to the square of the magnitude of the estimated desired signal.

27. The receiver of claim 26 wherein, in the event that the signal-to-interference-plus-noise ratio is below a threshold, the space-time filter is bypassed and the equalization processor determines the estimated sequence of symbols ŝ from the plurality of received sequences of signal samples and from a plurality of matrices of channel impulse response coefficients.

* * * * *

UNITED STATES PATENT AND TRADEMARK OFFICE
CERTIFICATE OF CORRECTION

PATENT NO. : 6,650,716 B1
DATED : November 18, 2003
INVENTOR(S) : Tharmalingam Ratnarajah It is certified that error appears in the above-identified patent and that said Letters Patent is hereby corrected as shown below:

Column 13,
Line 10, "….˙…" should be -- …˙…. --.
Line 18, "…⁻$S^*S^T$ …" should be -- …$^{-1}S^*S^T$ … --.

Column 14,
Line 39, " ….˙…" should be -- …˙…. --.
Lines 46 and 47, "… ⁻1X)…" should be -- …$^{-1}$X)… --.

Column 15,
Line 25, "….˙…" should be -- … ˙…. --.

Column 16,
Line 6, "….˙…" should be -- …˙…. --.

Signed and Sealed this

Ninth Day of November, 2004

JON W. DUDAS
*Director of the United States Patent and Trademark Office*